United States Patent [19]
Patton et al.

[11] Patent Number: 6,146,482
[45] Date of Patent: Nov. 14, 2000

[54] METHOD FOR DESIGNING HIGH PRESSURE LOW COST PRESTRESSED COMPOSITE WRAPPED TRANSMISSION LINE SYSTEM

[75] Inventors: Edward Matthew Patton, Boerne; Timothy Stewart Rennick; Carl Harry Popelar, both of San Antonio, all of Tex.

[73] Assignee: Southwest Research Institute, San Antonio, Tex.

[21] Appl. No.: 09/126,520

[22] Filed: Jul. 30, 1998

Related U.S. Application Data

[60] Provisional application No. 60/082,524, Apr. 21, 1998, and provisional application No. 60/082,384, Apr. 20, 1998.

[51] Int. Cl.$^7$ .............................. B23P 17/00; B32B 31/16
[52] U.S. Cl. ...................... 156/172; 29/421.1; 29/469.5; 156/229; 156/287; 428/35.8; 428/36.3; 703/1
[58] Field of Search ..................... 156/161, 165, 156/172, 187, 229, 287; 428/35.8, 35.9, 36.3, 36.91; 29/421.1, 446, 469.5, 523; 138/143, 144, 153, DIG. 5

[56] References Cited

U.S. PATENT DOCUMENTS

| | | |
|---|---|---|
| 2,401,092 | 5/1946 | Miller et al. . |
| 2,713,551 | 7/1955 | Kennedy . |
| 2,718,583 | 9/1955 | Norland et al. . |
| 3,068,562 | 12/1962 | Long .................................. 29/421.1 |
| 3,184,092 | 5/1965 | George . |
| 3,240,644 | 3/1966 | Wolff ..................................... 156/165 |
| 3,439,405 | 4/1969 | Berman et al. ........................ 29/421.1 |
| 3,844,730 | 10/1974 | Laussermair .............................. 29/446 |
| 3,969,812 | 7/1976 | Beck ..................................... 29/421.1 |
| 4,417,459 | 11/1983 | Tomita ..................................... 29/446 |
| 4,489,123 | 12/1984 | Schijve et al. .......................... 156/229 |
| 4,559,947 | 12/1985 | Fawley . |
| 4,589,562 | 5/1986 | Fawley .................................... 138/153 |
| 4,676,276 | 6/1987 | Fawley .................................... 156/172 |
| 4,688,374 | 8/1987 | Walker . |
| 4,700,782 | 10/1987 | Fawley . |
| 5,332,049 | 7/1994 | Tew . |
| 5,518,568 | 5/1996 | Fawley et al. . |
| 5,677,046 | 10/1997 | Fawley et al. . |
| 5,683,530 | 11/1997 | Fawley et al. . |

FOREIGN PATENT DOCUMENTS

| | | |
|---|---|---|
| 735870 | 6/1966 | Canada ................................. 156/161 |
| 1 209 495 | 8/1986 | Canada . |
| 1 278 226 | 8/1987 | Canada . |
| 1 251 151 | 3/1989 | Canada . |
| 323660 | 7/1989 | European Pat. Off. ............... 156/229 |

OTHER PUBLICATIONS

Theodore L. Willke, et al.; Composite–Reinforced Materials for Natural Gas Tranmission Piping:, 18$^{th}$ World Gas Conference; Berlin, Germany; Jul. 8–11, 1991.

*Primary Examiner*—Steven D. Maki
*Attorney, Agent, or Firm*—Paula D. Morris & Associates, P.C.

[57] ABSTRACT

A method for making a reinforced pipeline comprising determining the thicknesses of a metallic liner and a reinforcement which are effective to limit stresses on a reinforced pipeline at a known operating pressure to a known percentage of the specified minimum yield strength and a known percentage of at least one actual yield strength along the length of the pipeline which differs from the specified minimum yield strength. Preferably, the reinforced pipeline is pressurized to produce yielding which results in a residual stress pattern effective to resist ductile fracture propagation along a longitudinal axis of said metallic liner along a length of the pipeline comprising at least two actual yield strengths.

6 Claims, No Drawings

METHOD FOR DESIGNING HIGH PRESSURE LOW COST PRESTRESSED COMPOSITE WRAPPED TRANSMISSION LINE SYSTEM

This application claims the benefit of Ser. No. 60/082,524, filed on Apr. 21, 1998 and Ser. No. 60/082,384, filed on Apr. 20, 1998.

FIELD OF THE INVENTION

The present invention relates to a method for making reinforced gas and oil transmission lines. More particularly, the invention relates to a method for making large diameter (20 inches or more), high pressure (greater than 1000 psi) reinforced gas and oil transmission pipelines which minimizes the thickness required of the internal metallic liner and provides a predictable residual stress pattern effective to resist ductile fracture propagation along a length of pipeline having variable yield strengths.

BACKGROUND OF THE INVENTION AND PRIOR ART

Transmission lines are used to transport gas, oil, and other fluids, such as carbon dioxide, over long distances to customers or processing facilities. Large diameter transmission lines currently are made entirely of steel. The American Petroleum Institute (API) provides design guidelines for building these transmission lines, and the transmission lines also are regulated by the Department of Transportation's Office of Pipeline Safety (DOT/OPS). The API specifications for transmission lines (API 5L) provide design rules, specifications for acceptable grades of steel, and specifications for acceptable steel pipe joint construction. The API specified grades of steel for large diameter seam welded pipes are the X-series, where X-60 refers to a steel grade with a minimum yield strength of 60,000 psi (60 ksi).

Transmission lines—particularly those used to transport natural gas—are required to withstand higher and higher pressures and to transport more and more gas. The increased demands have led to the use of higher strength, lower toughness steels, such as X-80 steel, to manufacture the transmission lines. Unfortunately, the use of steels with lower toughness increases the potential for ductile rupture of the pipeline.

The danger of ductile rupture can be reduced somewhat by wrapping the steel transmission line with fiberglass reinforced plastic to prevent the propagation of ductile rupture-type fractures. However, fiberglass reinforcement by itself provides only protection against crack propagation along the pipeline. In order to provide more cost effective protection against ductile rupture, methods are needed which will (a) allow for a reduction in the thickness of the steel liner wall, and (b) provide for load sharing between the steel liner and the fiberglass reinforcement.

A technique called "autofrettage," which is practiced in the manufacture of composite wrapped pressure vessels, theoretically can be used to advantage. During autofrettage, a fiberglass composite wrapped metal vessel is subjected to an internal pressure greater than the pressure at which the metallic liner experiences plastic deformation. Once plastic deformation or yielding of the metallic liner occurs, the pressure is reduced. The resulting composite wrapped vessel is left with a relatively consistent residual stress pattern in which the metallic liner is in circumferential compression and the fiberglass composite wrap is in tension. This residual stress pattern (a) allows the fiberglass composite material, which has a much lower stiffness than the metallic liner, to carry a substantial portion of the pressure load, and (b) reduces the circumferential tensile stress on the metallic liner at the operating pressure of the vessel.

Autofrettage cannot be easily applied to transmission lines. In pressure vessels, the yield strength of the metallic liner is tightly controlled, and the use of a single autofrettage or "proof" pressure results in a consistent residual stress pattern within each vessel. In contrast, the only tightly controlled property for steels used to make transmission lines is the "minimum yield strength." In the art of manufacturing fluid transmission lines, "Specified Minimum Yield Strength" (SMYS) means that no portion of the pipeline can have a yield strength below the specified strength. The pipeline commonly has portions with a yield strength above the specified strength. For example, a pipeline made of X-60 steel may have portions ranging in yield strength FROM about 60 ksi up to about 75 ksi, with some welded areas having a yield strength as high as about 80 ksi.

Because of the potential variability in yield strength along a transmission line, the use of a single autofrettage or "proof" pressure does not necessarily result in a consistent residual stress pattern. Because of this, autofrettage has not been considered a viable method to reduce the danger of ductile fracture in transmission lines.

Methods are needed for (1) minimizing the thickness required of the metallic liner while maximizing the resistance to ductile fracture propagation, and (2) producing a consistent residual stress pattern effective to resist ductile fracture propagation along the longitudinal axis of a length of pipeline having variable yield strengths.

SUMMARY OF THE INVENTION

The invention is a method for making a reinforced pipeline comprising an inner metallic liner having a specified minimum yield strength and an outer reinforcement therearound. The method comprises: defining operating parameters comprising an operating pressure at a given internal diameter for the metallic liner; defining a first thickness for the metallic liner and a second thickness for the reinforcement; determining operating stresses on a length of said reinforced pipeline based on said operating parameters, said first thickness, said second thickness, said specified minimum yield strength, and at least one actual yield strength different from said specified minimum yield strength along said length; and, determining an adjusted first thickness and an adjusted second thickness effective to limit stresses on said reinforced pipeline at said operating pressure to a known percentage of the specified minimum yield strength and of the actual yield strength. The invention also involves pressurizing the reinforced pipeline to cause yielding of the metallic liner in an amount effective to produce a residual stress pattern effective to resist propagation of a ductile fracture along said length.

The invention includes a method comprising:
- defining operating parameters for a hypothetical reinforced pipeline comprising a hypothetical metallic liner having a hypothetical reinforcement therearound, said hypothetical metallic liner having a specified minimum yield strength, said operating parameters comprising an operating pressure at a given internal diameter for said hypothetical metallic liner;
- defining a first hypothetical thickness for said hypothetical metallic liner and a second hypothetical thickness for said hypothetical reinforcement;
- determining hypothetical operating stresses on a length of said hypothetical reinforced pipeline based on said operating parameters, said first hypothetical thickness of said hypothetical liner, said second hypothetical thickness of said hypothetical reinforcement, said specified minimum yield strength, and a variable yield strength of said hypothetical metallic liner that is greater than said specified minimum yield strength;

based on said hypothetical operating stresses, determining a safe operating thickness for an actual metallic liner and a safe operating thickness for an actual reinforcement therearound, said safe operating thickness for said actual metallic liner and said safe operating thickness for said reinforcement being effective to limit stresses on an actual reinforced pipeline operating at said operating pressure to a known predetermined percentage of said specified minimum yield strength or less and to said predetermined percentage of said variable yield strength or less;

providing said actual metallic liner and said actual reinforcement;

applying said actual reinforcement around said actual metallic liner, thereby forming said actual reinforced pipeline; pressurizing said actual reinforced pipeline to cause in the range of from about 0.75 to about 1% plastic yielding along portions of said actual reinforced pipeline having said specified minimum yield strength.

DETAILED DESCRIPTION OF THE INVENTION

The present invention provides a method for minimizing the thickness of a metallic liner while maximizing the burst strength of a reinforced pipeline, and for providing a consistent and predictable residual stress pattern in a reinforced pipeline comprising compressive stress in the steel liner and tensile stress in the composite reinforcement. The residual stress pattern resists ductile fracture propagation along the longitudinal axis of the metallic liner along a length of the pipeline even though the actual yield strength along the pipeline varies.

Transmission lines are made in part of a pipe or liner made of metal, such as steel, which is subject to ductile fracture propagation in a predetermined direction, such as along the longitudinal axis of the pipe. The transmission line may be wrapped in a reinforcement material. The application of the reinforcement material increases the strength of the pipeline in the circumferential direction and increases the ductile fracture resistance of the pipeline in the axial direction. The reinforcement provides substantial resistance to ductile fracture propagation along a longitudinal axis of the metallic liner, but does not provide a means of reducing the thickness of the metallic liner.

A major problem in designing a predictable residual stress pattern is the actual strength of the metallic liner along its length. As an example, steel pipe manufacturers traditionally have variations in their X-60 yield strengths of as much as 15 ksi (from about 60 ksi to about 75 ksi). In addition, the welding rod that is used by most pipeline welders for the girth welds typically is 70XX which has a minimum of 70 ksi strength in the as welded condition. Typical weld yield strengths can go as high as 80 ksi. Thus, the variability in steel yield strength in the pipeline can be as much as 20 ksi (60 to 80 ksi), when girth welds are included.

There are two basic approaches to the problem of developing a Composite Reinforced Pipeline (CRP) design taking into account the variability in actual strength of the metallic liner. A first approach is to perform a process during the wrapping of a pipe joint or after the pipe joint is wrapped that would provide a consistent, known pre-stress in the metallic liner. This approach, if technically and financially feasible, has the benefit of producing known levels of stress in the metallic liner and the composite over-wrap.

The second approach, taken in the present invention, is to understand the variability of the metal properties and to make the transmission line based on a parametric study of those properties. Using this approach, a test pressure is applied to the entire pipeline that is less than an autofrettage pressure, but that is sufficient to cause a plastic strain in the range of from about 0.75 percent to about 1 percent on the metallic liner. In other words, a test pressure is determined based upon the SMYS of the metallic liner. In addition, for metallic pipe joints with a higher yield strength, the variability of the working stresses in both the metallic liner and the composite over-wrap is determined and taken into consideration to ensure that these stresses still will provide safe pipeline operation, even though they are very different from the stresses on the sections of pipe having the minimum yield strength. Once the thickness of the metallic liner and reinforcement have been determined, the reinforced pipeline may be formed using known procedures.

The metallic liner may be substantially any size (diameter) and type of pipe with characteristics equivalent to metals such as stainless steel, aluminum, copper, or brass. The metallic liner typically will have a relatively large diameter, and typically will be treated to provide protection against electrolytic and biochemical corrosion, cathodic disbanding, soil stress, and mechanical damage. Generally, the liner is cleaned by either sand or grit blasting or by mechanical scraping and wire brushing to render the pipe surface free from oil, grease, dust, moisture, and non-adhering mill scale. The clean pipe then is wrapped with the reinforcement material, described more fully below, using any suitable procedure, for example, the method described in U.S. Pat. No. 4,676,276 to Fawley, incorporated herein by reference.

The metal pipe preferably is reinforced either at the site where the pipe itself is manufactured, or at some other site specifically designed for the application of the reinforcement using known procedures. The pipeline also may be reinforced in the field with a suitable reinforcement material, preferably a composite reinforcement material, and most preferably a fiberglass reinforcement material. A machine or set of machines capable of applying the reinforcement material at the rate of a mile of pipe per day would be required to make the process cost effective and cost competitive with an all steel pipe. If the pipe is reinforced at the manufacturer, the rate of reinforcement preferably should meet the rate of production of the pipe by the manufacturer's facility. The reinforcement material is wrapped around the pipe under a tension (a) less than a wrapping tension that would cause fibers in the reinforcement material to break or that would cause any perceptible prestress in the pipe, but (b) sufficient to assure that any fibers stay straight and parallel during wrapping and lie down in order on the pipe.

Where the reinforcement material is fiberglass, the fibers preferably are lightweight continuous unidirectional high-strength inorganic fibers, preferably glass fibers. Among the fibers useful in the reinforcement material are "E" type fiberglass, "S" type fiberglass, and KEVLAR. A preferred fiberglass is low cost, high performance "E" type fiberglass. The reinforcement material preferably is non-corrodible by the atmosphere, the soil, and most chemicals. The reinforcement material also preferably is electrically non-conductive so that it does not cause galvanic corrosion of the pipe and does not disturb cathodic corrosion protection, which often is provided in a pipeline. Preferred commercially available reinforcement materials are ADVANTEX™ glass fiber, which is commercially available from Owens Corning, Toledo, Ohio, or other similar structural glass fiber systems.

In order to form the composite reinforcement material, the fibers are impregnated with a viscous material which is capable of curing or hardening by time, heating, cooling, chemical reaction, moisture, ultraviolet light, or the like. Suitable viscous materials for use in forming the composite reinforcement material include, but are not necessarily limited to urethane, epoxy resin, vinyl ester, and isophthalic polyester resin. Preferred viscous materials are urethane resins and isophthalic polyester resins, most preferably isophthalic polyester resins. A preferred commercially available resin is AMOCO F-764 Isopolyester, available from Amoco Chemical, Napierville, Ill.

The fibers may be impregnated with the resin, e.g., by passing them through a bath or over a coating roller or the like, immediately before wrapping the pipe. The resin then should be cured. In a preferred embodiment, the resin impregnated fibers are exposed to a suitable source of UV light either by rotating the pipe to expose the entire circumference or by moving a UV light source which surrounds the pipe along the length of the pipe. The cured resin forms a fluid impervious composite mass winch prevents the ingress of moisture and dirt, and also bonds the fibers to one another and to the pipe. Additional resin may be applied to the fibers as they are wrapped around the pipe, or after wrapping to avoid damage during transportation and subsequent procedures.

A portion of the stress in the circumferential direction of the metallic liner, i.e., the hoop stress, is taken up by the composite wrapping. The circumferential strength imparted to the pipe by the unidirectional fibers can be controled so that the imparted circumferential strength can be twice the strength of the bare metallic liner. The imparted circumferential strength can be regulated by the type, number, size of fibers, and thickness of the reinforcement material. The reinforcement material is substantially as strong as steel, but only about one-third as dense as steel, and thus weighs only a fraction as much as steel. The use of the reinforcement material can have little or no cost impact on the construction of the transmission line. A short section of each end of the pipe section is left unreinforced so that the pipe sections can be welded together on site without damage to the fiberglass reinforcement.

The reinforced and cured pipe sections are transported to the site where the pipeline is being constructed, and the sections of the pipeline are welded together to construct a section the proper length for hydrostatic testing or autofrettage. The welded joints between the pipe sections are reinforced with field application of reinforcement material and resin, and the resin is cured, to make a fully reinforced section of transmission line. The pipe then is subjected to a process similar to "autofrettage" (the inventive pressurization process is sometimes hereinafter called "autofrettage" for simplicity). A predetermined hydrostatic pressure is applied to the pipeline sufficient to cause a small amount of yielding (0.75–1%) of the metallic liner. The pressure is maintained until all of the required yielding has occurred. The pressure then is removed, resulting in a residual stress pattern comprising residual compressive stress in the metallic liner and residual tensile stress in the reinforcing material. This residual stress pattern resists the longitudinal propagation of ductile rupture type fractures, and also allows for a reduction in the wall thickness required for the metallic liner. The application of the hydrostatic test pressure provides the required hydrostatic test of a constructed section of the transmission line.

In order to induce a consistent, predictable residual stress pattern according to the invention, the stresses in the metallic liner and reinforcement are calculated, taking into account the variability in the yield strength of the metallic liner. These calculated values, rather than the Specified Minimum Yield Strength (SMYS) of the metallic liner, then are used to design the transmission line. The result is that the stresses in both the metallic liner and the reinforcement material are limited to a known percentage of the actual yield and ultimate strengths of those materials, with the pipeline operating at its maximum rated pressure.

In order to meet DOT standards for non-steel pipe, the pressure applied to the reinforced pipeline during "autofrettage" should be at least 125% of the expected operating pressure. Preferably, a hypothetical "autofrettage" pressure which is approximately 30–40% higher than the expected operating pressure is used as a starting point. The pressure should be sufficiently high that, at minimum specification properties (SMYS), an amount of about 0.75–1% plastic yielding is achieved. Using the hypothetical set of parameters, a structural analysis is performed to calculate the stress in the metallic liner and in the reinforcement for a range of actual metal yield strengths. The results are used to calculate the characteristics of a transmission line made of both a metallic liner and composite reinforcement in order to determine the design required to meet the applicable DOT standards.

In the following discussion, the following characters represent the following values:

eO or $\epsilon_o$=total circumferential strain in pipe (elastic and plastic)

$E_1$=elastic modulus of steel $E_2$=tangent modulus of steel after yield-bilinear stress-strain curve $E_r$=elastic modulus of reinforcement (fiberglass)

$\epsilon_r$=strain in reinforcement $\epsilon_{ri}$=strain in reinforcement at autofrettage pressure $\epsilon_s$=strain in steel $\epsilon_{si}$=strain in steel at autofrettage pressure $\epsilon_y$=yield strain (typically accepted to be 0.002)

$\sigma_r$=stress in reinforcement $\sigma_{ri}$=stress in reinforcement at autofrettage pressure $\sigma_s$=stress in steel $\sigma_{si}$=stress in steel at autofrettage pressure $\sigma_y$=yield strength of steel P=pressure R=radius of pipe sy=yield strength of steel $t_r$=thickness of reinforcement $t_s$=thickness of steel $r_r$=radius of reinforcement $r_s$=radius of steel The predetermined hydrostatic pressure for the "autofrettage" type pressurization may be determined by making the following assumptions 1. $t_s/R$, $t_r/R \ll 1$; pipe is thin-walled.
2. Uniaxial reinforcement in hoop direction, providing no axial support.
3. Yielding of metal is bi-linear ($E_1$ & $E_2$); reinforcement remains elastic ($E_r$)

Compatibility of the interface between the reinforcement and the metal requires, $$\epsilon_r = \epsilon_s \tag{1}$$

Equilibrium requires, $$PR = r_r t_r + r_s t_s \tag{2}$$

Initial pressurization causes the metal to yield, $$\epsilon_n = \epsilon_{si} = \epsilon_o > \epsilon_y \tag{3}$$

$$\sigma_{si} = \sigma_y + (\epsilon_{si} - \epsilon_y)E_2 \tag{4}$$

Then, $$PR = \sigma_n t_r + (\sigma_y + (\epsilon_{si} - \epsilon_y)E_2)t_s$$

$$PR = \epsilon_n t_r E_r t_r + \sigma_y t_s + \epsilon_s E_2 t_s - \epsilon_y E_2 t_s = \epsilon_o (E_r t_r + E_2 t_s) + \sigma_y t_s (1 - E_2/E_1) \tag{5}$$

And, $$P = [\epsilon_o (E_r t_r + E_2 t_s) + \sigma_y t_s (1 - E_2/E_1)]/R \tag{6}$$

For example, using typical values for E-Glass (70% $V_f$) (University of Delaware Composites Design Guide) and API X-60, found in the API 5-L specification for steel pipe, the following pressures (based on expected variations in $\sigma_y$) are required when yielding the metal ($\epsilon_o > \epsilon_y$):

| R = 18.0 | E2 = 60000 | E1 = 30000000 | e0 = 0.012 |
|---|---|---|---|
| tr = 0.55 | ts = 0.55 | Er = 7000000 | |

$$P(sy) = \frac{e0 \cdot (E_r \cdot t_r + E_2 \cdot t_s) + sy \cdot t_s\left(1 - \frac{E1}{E2}\right)}{R}$$

$$P(60000) = 4.4183 \times 10^3$$
$$P(65000) = 4.5708 \times 10^3$$
$$P(70000) = 4.7233 \times 10^3$$
$$P(60000) = 4.4183 \times 10^3$$
$$P(65000) = 4.5708 \times 10^3$$
$$P(70000) = 4.7233 \times 10^3$$

If the axial stress in the reinforcement is negligible and the axial stress in the metal remains less than the yield strength, $$\sigma_{s(axial)} = PR/2t_s < \sigma_y \tag{7}$$

Substituting (5) into (7).

$$\epsilon_o(E_r t_r/t_s + E_2) + \sigma_y(1 - E_2/E_1) < 2\sigma_y \tag{8}$$

Then, $$\epsilon_o < \sigma_y(1 - E_2/E_1)/(E_r t_r/t_s + E_2) \tag{9}$$

For a pipe with only hoop reinforcement, equation (9) sets the upper limit on strain when conducting autofrettage by internal pressurization by ensuring that no axial yielding occurs. For varying values of $\sigma_y$, these limits are:

$$e0(sy) = \frac{sy \cdot \left(1 - \frac{E2}{E1}\right)}{\left(Er \cdot \frac{tr}{ts} + E2\right)} \quad \begin{array}{l} e0(60000) = 0.0085 \\ e0(65000) = 0.0092 \\ e0(70000) = 0.0099 \end{array}$$

Upon depressurization, the pipe unloads elastically and equation (1) becomes, $$\epsilon_{ru} = \epsilon_{su}$$

$$\epsilon_{su} = \epsilon_o - 1/E_1((\sigma_{si} - \sigma_{su}) - \upsilon PR/(2t_s)) \tag{10}$$

Substituting (2), (4) and (5) into (10), and solving.

$$-\sigma_{su} t_s / E_r t_r = \epsilon_o - \sigma_{si}/E_1 + \sigma_{su}/E_1 + \upsilon PR/(2E_1 t_s)$$

$$-\sigma_{su}(1/E_1 + t_s/E_r t_r) = \epsilon_o - (\sigma_y + (\epsilon_o - \epsilon_y)E_2)/E_1 + \upsilon(\epsilon_o(E_r t_r + E_2 t_s) + \sigma_y t_s(1 - E_2/E_1))/2E_1 t_s)$$

$$\sigma_{su} = \{\epsilon_o[1 - E_2/E_1 + \upsilon(E_r t_r/(E_1 t_s) + E_2/E_1)/2] - \epsilon_y[1 - E_2/E_1 - \upsilon(1 - E_2/E_1)/2]\}E_1/(E_1 t_s/(E_r t_r) + 1) \tag{11}$$

Numerically solving for $\sigma_{su}$ $$cy = 0.002 \quad e0 = 0.012 \quad nu = 0.29$$

$$ssu = \left[c0 \cdot \left[1 - \frac{E2}{E1} + \frac{nu}{2} \cdot \left(\frac{Er \cdot tr}{E1 \cdot ts} + \frac{E2}{E1}\right)\right] - ey \cdot \left[1 - \frac{E2}{E1} - \frac{nu}{2}\left(1 - \frac{E2}{E1}\right)\right]\right] \frac{E1}{\left(\frac{E1 \cdot ts}{Er \cdot tr} + 1\right)}$$

$$ssu = 6.061 \times 10^4$$

And solving for $\sigma_{su}$ $$Sru = ssu \text{ fraction } sru = 6.061 \times 10^4$$

Now if the pipe is repressurized such that $\sigma_{su} = S < \sigma_y$ equation (1) takes the form, $$(\sigma_{rr} - \sigma_{ru})/E_r = (S - \sigma_{su} - \upsilon PR/(2t_s))/E_1 \tag{12}$$

Reducing and solving for pressure, where $\sigma_{rs} = PR/t_r - St_2/t_r$ $$PR/t_r - St_s/t_r = \sigma_{su} t_s/t_r + Er(S - \sigma_{su} - \upsilon PR/(2t_s))/E_1$$

$$PR(1 + \upsilon E_r t_r/(2E_1 t_s))/t_r = S(t_s t_r + E_s/E_1) - \sigma_{su}(t_s/t_s + E_s/E_1)$$

$$P = (S - \sigma_{os})t_s[1 + E_r t_r/E_1 t_s]/R[1 + \upsilon E_s t_r/(2E_1 t_s)] \tag{13}$$

The operating pressure, for a given S, is then, $$P(S) = \left(\frac{S - ssu}{R}\right) \cdot ts \cdot \frac{\left(1 + \frac{Er \cdot tr}{E1 \cdot ts}\right)}{\left(1 + \frac{nu \cdot Er \cdot tr}{1 + 2 \cdot E1 \cdot ts}\right)}$$

$$P(43200) = 3.7841 \times 10^3$$

For example, assume that it is desired to operate a pipeline with composite reinforced pipe. The current design of the pipeline is for a 42 inch diameter X-80 all steel line pipe operating at 2200 psi. Assume a target for the CRP to be a the same diameter and pressure, but using a X-60 liner reinforced with fiberglass. Four potential design targets must be addressed: (1) Composite Reinforced Line Pipe with pre-stress of the steel; (2) Composite Reinforced Line Pipe without any steel pre-stress; (3) all steel X-60 line pipe; and, (4) all steel X-80 line pipe. The API rules for steel pipe state that the hoop stress in the steel pipe at operating pressure can be no more than 72% of the Specified Minimum Yield Stress (SMYS) of the steel. For X-60 steel, this is therefore 43,200 psi. The DOT regulations for fiber wound compressed gas cylinders states that the working stress in the composite over-wrap can be no more than 30% of the strength of the glass, or in the present example, 45,000 psi (150,000 psi ultimate strength).

For (1), Composite Reinforced Pipe with pre-stress of the steel, the steel and fiberglass will be defined for simplicity as having equal thickness. The overall pipe thickness will be approximately 1.0 inches, composed of 0.5 inches of steel and 0.5 inches fiberglass. The pre-stress that would have to be created in the steel could be provided by pressurizing the steel to in the range of from about 0.75% to 1% plastic strain. This pre-stress will provide a residual compressive stress (at zero internal pressure) of about 34,000 psi, and an equivalent tensile stress in the composite over-wrap of 34,000 psi (because they are the same thickness).

For (2), Composite Reinforced Pipe without any steel pre-stress, there can be no pre-stress of the steel, and the steel must operate at 72% of the yield, or 43,200 psi. At this stress, since the composite will strain the same amount as the steel (no pre-stress or yielding, everything remains elastic), the stress in the composite will be 10,080 psi. The thickness of the steel and composite will both have to be 0.87 inches, or the line pipe will be 1.74 inches in thickness.

For (3), an all steel X-60 line pipe, the thickness will be 1.07 inches, and for (4), an X-80 line pipe, the thickness will be 0.809 inches. All of these examples use the current API and DOT design rules for pipelines and over-wrapped pressure vessels. It is apparent from the above that pre-stress of the steel is required at some level for any design of CRP to be considered to be competitive with the steel.

|  | CRP PS | CRP no | X-60 | X-80 |
|---|---|---|---|---|
| Diameter | 42 | 42 | 42 | 42 |
| Pressure | 2200 | 2200 | 2200 | 2200 |
| t steel | 0.5 | 0.87 | 1.07 | 0.809 |
| t comp. | 0.5 | 0.87 | 0 | 0 |
| weight/ft | 280 | 490 | 480 | 360 |

Note that, in addition to thickness dimensions, a weight per foot estimate was added at the bottom of the table. This shows the real differences in each of the design options, and shows directly the benefits of pre-stressing the steel.

Table 1 demonstrates an alternate method for determining the parameters of a proposed steel/composite transmission line. Table 1 shows a prestressed composite reinforced pipe with an X-60 liner nominally 0.5 inches in thickness, and an equal thickness of fiberglass reinforcement when the pressure is: (a) increased up to the hydrostatic test pressure; (b) reduced to zero pressure showing the residual stresses in both steel and fiberglass; and (c) then taken back up to operating pressure showing the stresses in both fiberglass and steel. Table I also gives such calculations for pipe sections of an X-60 steel liner which may have other yield strengths, up to X-80.

Based on the data presented in Table I, those portions of the X-60 steel liner with actual yield strengths of 60 ksi clearly meet the DOT 72% limitation. The circumferential stress on the steel liner approaches 75% of the actual yield strength for those portions of the steel liner with actual yield strengths of 75 ksi, and approaches 76% for those portions of the steel liner with actual yield strengths of 80 ksi. For the fiberglass, the highest circumferential stress is in those locations where the actual yield strength of the steel is 60 ksi. In these locations, the stress in the fiberglass is slightly in excess of 50 ksi, which is approximately ⅓ of the ultimate strength of the fiberglass, within the guidelines of the DOT for fiberglass wrapped pressure vessels. In those areas where the steel is actually a higher yield strength, there is less load sharing by the fiberglass, and the fiberglass stress in the circumferential direction is lower than in the area where the actual yield strength is at its specified minimum. In other words, in those areas where the steel stress is higher, the stress in the fiberglass is lower, and the pipe is inherently safe, meeting the intent of the DOT guidelines.

The 72% DOT limit is based on a pipeline made entirely of steel. It is not clear how this 72% limit should apply in the case of a metal/composite pipeline. In order to address this issue, the present invention uses a Limit States design. In a Limit States design, all of the metal operates at some given percentage of its actual yield strength, and a structural analysis is performed to determine the margins of safety left in the pipeline given that the metallic liner exhibits a range of different yield strengths. In this manner, the composite reinforcement can not only resist the propagation of ductile fracture, it can also be designed to carry a significant fraction of the pressure load of the pipe.

Persons of ordinary skill in the art will recognize that many modifications may be made to the present invention without departing from the spirit and scope of the present invention. The embodiment described herein is meant to be illustrative only and should not be taken as limiting the invention, which is defined in the following claims.

We claim:

1. A method for designing an actual reinforced pipeline having a specified minimum yield strength comprising:

defining operating parameters for a hypothetical reinforced pipeline comprising a hypothetical metallic liner having a hypothetical reinforcement therearound, said hypothetical metallic liner having the specified minimum yield strength, said operating parameters comprising an operating pressure at a given internal diameter for said hypothetical metallic liner;

defining a first hypothetical thickness for said hypothetical metallic liner and a second hypothetical thickness for said hypothetical reinforcement;

determining hypothetical operating stresses on a length of said hypothetical reinforced pipeline based on said operating parameters, said first hypothetical thickness, said second hypothetical thickness, the specified minimum yield strength, and a variable hypothetical yield strength along said length of said hypothetical metallic liner that is greater than the specified minimum yield strength; and, based on said hypothetical operating stresses, determining a safe operating thickness for an actual metallic liner and a safe operating thickness for an actual reinforcement therearound; said safe operating thickness of said actual liner and said safe operating thickness of said actual reinforcement being effective to limit stresses on the actual reinforced pipeline operating at said operating pressure to a predetermined percentage of the specified minimum yield strength or less and to said predetermined perentage of said variable yield strength or less.

2. The method of claim 1 further comprising providing said actual metallic liner having said safe operating thickness; and applying around said actual metallic liner said actual reinforcement having said safe operating thickness.

3. The method of claim 2 wherein said predetermined percentage of the specified minimum yield strength is no more than about 72% and said predetermined percentage of said variable yield strength is no more than about 72%.

4. The method of claim 3 wherein said method further comprises pressurizing said actual reinforced pipeline to cause yielding of said actual metallic liner in an amount effective to produce a residual stress pattern effective to resist ductile fracture propagation along a longitudinal axis of said actual metallic liner, said residual stress pattern comprising residual compressive stress on said actual metallic liner and residual tensile stress on said actual reinforcement.

5. The method of claim 1 wherein said predetermined percentage of the specified minimum yield strength is no more than about 72% and said predetermined percentage of said variable yield strength is no more than about 72%.

6. A method comprising:

defining operating parameters for a hypothetical reinforced pipeline comprising a hypothetical metallic liner having a hypothetical reinforcement therearound, said hypothetical metallic liner having a specified minimum yield strength, said operating parameters comprising an operating pressure at a given internal diameter for said hypothetical metallic liner;

defining a first hypothetical thickness for said hypothetical metallic liner and a second hypothetical thickness for said hypothetical reinforcement;

determining hypothetical operating stresses on a length of said hypothetical reinforced pipeline based on said operating parameters, said first hypothetical thickness of said hypothetical liner, said second hypothetical thickness of said hypotbetical reinforcement, said specified minimum yield strength, and a variable yield strength of said hypothetical metallic liner that is greater than said specified minimum yield strength;

based on said hypothetical operating stresses determining a safe operating thickness for an actual metallic liner and a safe operating thickness for an actual reinforcement therearound, said safe operating thickness for said actual metallic liner and said safe operating thickness for said reinforcement being effective to limit stresses on an actual reinforced pipeline operating at said operating pressure to a predetermined percentage of said specified minimum yield strength or less and to said predetermined percentage of said variable yield strength or less;

providing said actual metallic liner and said actual reinforcement;

applying said actual reinforcement around said actual metallic liner, thereby forming said actual reinforced pipeline;

pressurizing said actual reinforced pipeline to cause in the range of from about 0.75 to about 1% plastic yielding along portions of said actual reinforced pipeline having said specified minimum yield strength.

\* \* \* \* \*

UNITED STATES PATENT AND TRADEMARK OFFICE
CERTIFICATE OF CORRECTION

PATENT NO. : 6,146,482
DATED : November 14, 2000
INVENTOR(S) : Patton et al.

It is certified that error appears in the above-identified patent and that said Letters Patent is hereby corrected as shown below:

<u>Title page,</u>
Item [56], References Cited, U.S. PATENT DOCUMENTS, please delete
"4,700,782     10/1987    Fawley" and insert -- 4,700,752    10/1987    Fawley --.

Signed and Sealed this

Twenty-seventh Day of April, 2004

JON W. DUDAS
*Acting Director of the United States Patent and Trademark Office*